Dec. 28, 1926.
R. E. RAWSON ET AL
1,612,316
REVOLVING SCRAPER
Filed May 27, 1926
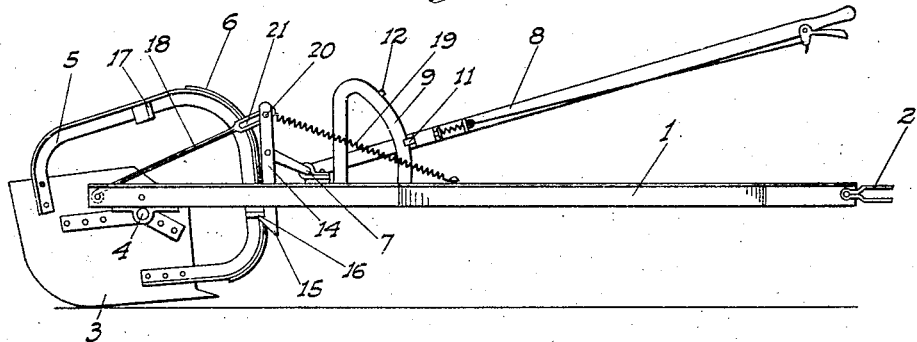
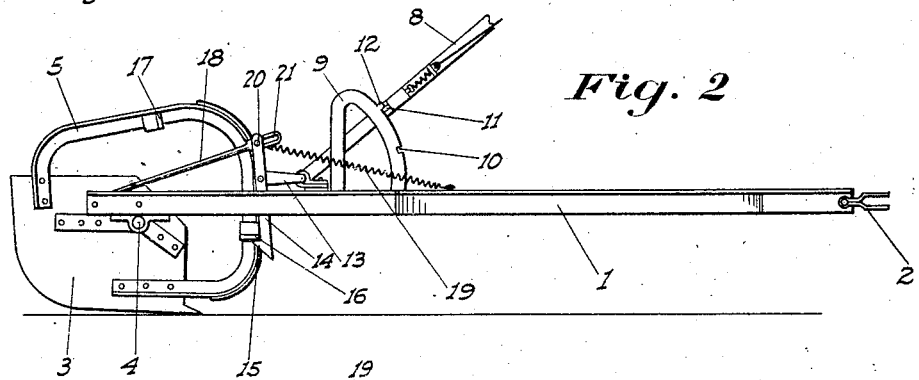
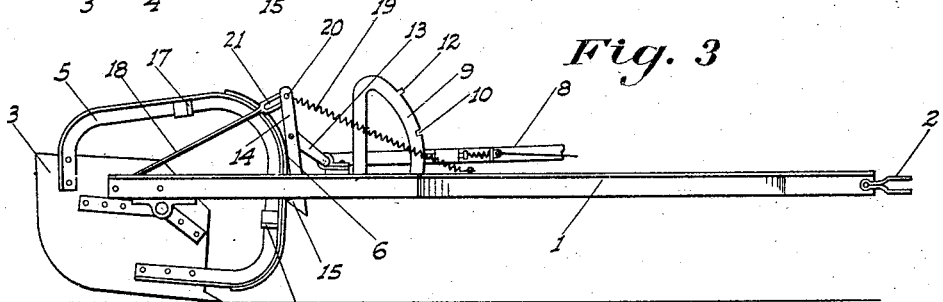
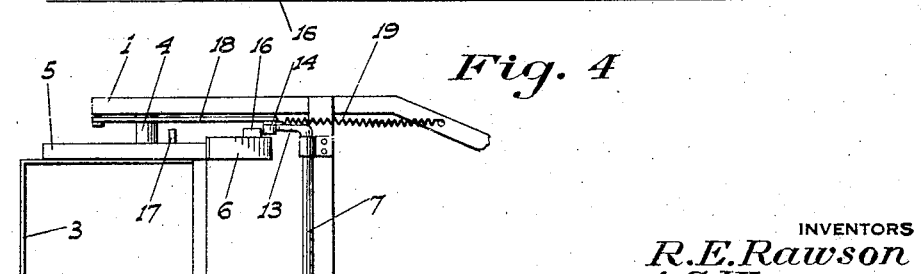
INVENTORS
R.E. Rawson
A.G. Weaver
BY
ATTORNEY Patented Dec. 28, 1926.

1,612,316

UNITED STATES PATENT OFFICE.

RALPH E. RAWSON AND ANDREW G. WEAVER, OF STOCKTON, CALIFORNIA.

REVOLVING SCRAPER.

Application filed May 27, 1926. Serial No. 111,952.

This invention relates to scrapers of that type in which a bowl is rotatably mounted on a frame and rests on the ground so that it constantly tends to rotate with the forward movement of the frame.

The principal object of our invention is to provide a control means for a scraper of this general type of an extremely simple and efficient nature and so constructed that the operator of the tractor or other draft means can at his option easily cause the bowl to be held from rotation in either scraping, carrying or spreading positions; or to allow it to make a complete revolution for quick dumping purposes.

These objects we accomplish by means of such structure and relative arrangement of parts as will fully appear by a perusal of the following specification and claims.

In the drawings similar characters of reference indicate corresponding parts in the several views:

Fig. 1 is a side elevation of the scraper showing the control means set to hold the bowl in a carrying position.

Fig. 2 is a similar view showing the position of the control means when the bowl is in its scraping position.

Fig. 3 is a similar view showing the control means as moved to enable the bowl to upset.

Fig. 4 is a fragmentary top plan view of the scraper.

Referring now more particularly to the characters of reference on the drawings, the numeral 1 denotes a horizontal frame preferably of the forked or A shaped type. This frame is provided at its front end with a clevis 2 for supporting attachment to a tractor or the like. Disposed between the rear ends of the frame is a bowl 3 having trunnions 4 turnably mounted on the frame. The bowl may be of the well known Fresno type having runners 5 projecting upwardly and forwardly from the sides thereof and ground bearing shoes 6 secured to and extending around the runners over a portion of their extent.

Journaled onto the frame a certain distance ahead of the bowl and shoes is a transverse shaft 7 to which is connected a lever 8 which extends forwardly to a point adjacent the forward end of the frame 1. Mounted on the frame adjacent the lever is a quadrant or comb 9 having a single notch 10 to engage a releasable spring pressed dog or pawl 11 of common character mounted on the lever. The quadrant also has a stop 12 a certain distance above the notch 10 arranged to engage the lever and prevent further upward movement of the same.

Projecting rearwardly from the ends of the shaft 7 are short radial arms 13 onto whose rear ends are pivoted vertical catch members 14, there being one of these catch members adjacent each runner 5. It will be evident that the shaft 7, lever 8 and arms 13 together form a unitary lever structure and they are considered such in the claims. The lower end of each catch member is provided with a rearwardly extending lug 15 adapted to project under either one at a time of a pair of stops 16 and 17 projecting laterally from the adjacent runner and disposed a substantially equal distance from the trunnion 4. The arms 13 are pivoted onto the arms 14 intermediate the ends of the latter, the upper ends of the latch members having sliding engagement with the forward ends of guide and movement limiting rods 18 which at the rear ends are pivotally mounted on the frame. Tension springs 19 project forwardly from the upper ends of the catch members to suitable connections with the frame.

The above parts are so arranged that when the lug 15 is engaged with the stop 16, and the pawl 11 of the lever is engaged with the quadrant notch 10, the bowl 3 will then be in a load carrying position, as shown in Fig. 1. In this position of the parts the lever 8 has a certain upward slope while the arms 13 also have an upward slope but in the opposite direction. The springs 19 constantly act on the catch members 14 to turn the same about their pivotal connections with the arms 13. This acts to cause the lower ends of the members 14 to be maintained abutted against the stops 16, and the pins 20 at the upper ends thereof to be moved toward the forward ends of the longitudinal slots 21 in the guide rods 18. With the forward movement of the frame the bowl of course tends to rotate upwardly but cannot do so as long as the pawl 11 is in engagement with the notch 10. A load carried by the bowl may therefore be transported to any desired point without such load being dumped and without any attention or exertion on the part of the operator being necessary.

When it is desired to dump the load the lever pawl is released from the quadrant and the lever is depressed to the position shown in Fig. 3. This causes the upward slope of the arms 13 to be increased, which moves the pivotal connection of said arms with the catch members closer to the shaft 7 in a longitudinal plane, and during this movement of the lever the pins 20 have reached the forward ends of the slots 21 and cannot go any further. Therefore with the completion of the downward movement of the lever the catch members rock about the pins 20 as an axis and swing upwardly toward their lower ends. This causes the catch members to be disengaged from the stops 16, so that the bowl is then free to rotate. If the lever is immediately released and returned to its notch engaging position, the catch members will be in position to engage the other stops 17 and hold the bowl from further rotative movement. If it is desired, however, to have the bowl completely upset the lever is simply maintained in its lowermost position until the stops 17 have passed by the lugs 15.

To move the bowl from a carrying to a scraping position it is only necessary to release the pawl 11 from the quadrant and instead of depressing the lever allow the rotative force of the bowl to pull downwardly on the catch members, thereby raising the lever until it is stopped by the member 12. This stop is positioned a sufficient distance from the notch 10 to cause the bowl, when the lever is thus stopped, to be moved so that the scraping edge of the bowl will be in suitable engagement with the ground, as shown in Fig. 2. During this movement of the lever the arms 13 are descending and their pivotal connections with the catch members are moving farther away from the shaft 7. The pull of the springs 19 maintains the lower ends of the members 14 abutted against the stop 16 and the pins 20 on the upper ends of the arms slide rearwardly along the slots 21, as shown in Fig. 2.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A scraper including a frame, a bowl pivoted on the frame and engaging the ground, a vertical catch member disposed ahead of the bowl, and having a rearwardly projecting lug on its lower end, a stop projecting laterally from the bowl and normally overhanging and engaged by the lug, a lever structure pivoted intermediate its ends onto the frame and pivoted at its rear end onto the catch member intermediate its ends, and means whereby when the lever is moved in one direction from a predetermined position the lug on the catch member will still be maintained in engagement with the stop member but when the lever is moved in the opposite direction from said predetermined position the lug will be moved forwardly of the stop and disengaged therefrom.

2. A scraper including a frame, a bowl pivoted on the frame and engaging the ground, a vertical catch member disposed ahead of the bowl, and having a rearwardly projecting lug on its lower end, a stop projecting laterally from the bowl and normally overhanging and engaged by the lug, a lever structure pivoted intermediate its ends onto the frame and pivoted at its rear end onto the catch member intermediate its ends, a member pivoted onto the frame rearwardly of the catch member and having a longitudinal slot at its forward end, a projection on the upper end of the catch member engaging the slot, and a tension spring connected to the catch member above the connection of the lever therewith and extending forwardly to a connection with the frame; the forward end of the slot being rearwardly of the pivotal connection of the lever with the frame and the rear portion of the lever being disposed to move above the horizontal plane of the pivot of the lever when the latter is lowered from a normal predetermined position.

In testimony whereof we affix our signatures.

RALPH E. RAWSON.
ANDREW G. WEAVER.